United States Patent Office 3,639,499
Patented Feb. 1, 1972

3,639,499
POLYPHENYLENE OXIDE RESINS BLENDED WITH COUMARONE-INDENE RESINS
Hugh E. Snodgrass, Mishawaka, and Robert L. Lauchlan, Granger, Ind., assignors to Uniroyal, Inc., New York, N.Y.
No Drawing. Filed July 22, 1970, Ser. No. 57,297
Int. Cl. C08f 31/04
U.S. Cl. 260—829                          4 Claims

ABSTRACT OF THE DISCLOSURE

Blends of poly(phenylene ether) resins with high melting hydrocarbon resins provide thermoplastic compositions characterized by increased moduli or stiffness, and also increased tensile strength and hardness.

INTRODUCTION

The present invention relates to poly(phenylene ether) resin compositions characterized by much improved moduli or stiffness and by much improved tensile strength and hardness. More particularly, the invention relates to a thermoplastic resin blend of a polyphenylene ether resin with a high melting hydrocarbon resin.

BACKGROUND OF THE INVENTION

The poly(phenylene ether) resins are known and described in numerous publications including U.S. Pat. Nos. 3,306,874 and 3,306,875 of Allan S. Hay and U.S. Pat. Nos. 3,257,357 and 3,257,358 of Gelu Stoeff Stamatoff. The high molecular weight polymers are high performance engineering thermoplastics possessing relatively high softening points, i.e., in excess of 275° F. and excellent dimensional stability. Typical examples of such polymers and methods of making same are found in the aforementioned U.S. patents, and New Linear Polymers, by Lee et al., N.Y., McGraw-Hill, 1967, pages 61–82, the contents of which are incorporated herein by reference.

However, those poly(phenylene ether) resins presently available on a commercial basis do not have sufficiently high moduli nor sufficient tensile strength and hardness to permit use of these materials in applications where they might otherwise be advantageously employed.

STATEMENT OF THE INVENTION

The present invention is predicated upon the discovery that a high melting hydrocarbon resin, when added to a high molecular weight poly(phenylene ether) resin in the amount of from about 1 to 45 percent (all percentages are expressed by weight herein), results in a thermoplastic composition having substantially improved moduli or stiffness, tensile strength, and hardness.

A further advantage of the invention is that the incorporation of high melting hydrocarbon resins substantially reduces the molding temperature of the poly(phenylene ether), by reducing the melt viscosity of the resin. This is particularly advantageous as it is difficult to injection mold unmodified poly(phenylene ether) resins because of the high temperatures required to achieve the necessary flow properties in a molding operation.

Because of their excellent physical strength properties and excellent thermal properties the polymer blends of this invention have many uses. For example, they can be used in molding powder formulations to make molded parts such as gears, bearings and cams. They can be used to prepare calendered or extruded articles and can be applied to a broad spectrum of uses in the form of sheets, rods, etc.

DESCRIPTION OF THE INVENTION

In one of its broader aspects, the object of the present invention is achieved through the physical admixing of a thermoplastic poly(phenylene ether) resin with a high melting hydrocarbon resin.

The poly(phenylene ether) resins with which this invention is concerned are those having the repeating structural unit of the formula:

(I) 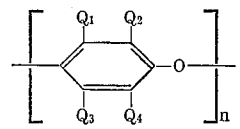

wherein the oxygen ether atom of one unit is connected to the benzene nucleus of the next adjoining unit, $n$ is a positive integer and is at least 100, and $Q_1$ thru $Q_4$ are monovalent substituents, each selected from the group consisting of hydrogen, halogen, hydrocarbon radicals free of tertiary alpha-carbon atoms, halohydrocarbon radicals having at least two carbon atoms between the halogen atom and phenol nucleus and being free of tertiary alpha-carbon atoms, hydrocarbonoxy radicals free of tertiary alpha-carbon atoms, and halohydrocarbonoxy radicals having at least two carbon atoms between the halogen atom and phenol nucleus and being free of tertiary alpha-carbon atoms.

Typical examples of such polymers and methods of making same are found in U.S. Pats. 3,306,874; 3,306,875; 3,257,375; 3,361,851; and New Linear Polymers, by Lee et al., N.Y., McGraw-Hill, 1967, pages 61–82, the contents of which are hereby incorporated herein by reference.

The preferred poly(phenylene ether) resins are those having alkyl substitution ortho to the oxygen ether atom and most preferably, ortho methyl substitution. Such polymers are readily available on a commercial basis and combine with the high melting hydrocarbon resins to form homogeneous mixtures having an excellent combination of useful physical properties.

The high melting hydrocarbon resins with which the present invention is concerned may be generally described as those resins obtained through the catalytic polymerization of coal-tar naphthas. Such coal-tar naphthas contain resin-forming materials which include, for example: styrene, coumarone, indene, methyl coumarones, methyl indenes, dimethylcoumarones, dicyclopentadiene, methyl cyclopentadienes, cyclohexadienes, naphthalene and anthracene derivatives.

Polymerization of the aforesaid resin-forming materials is effected by the catalytic action of a Brønsted acid, such as sulfuric acid or a derivative thereof, or of a Lewis acid, such as stannic chloride, antimony pentachloride, aluminum chloride, titanium tetrachloride, or boron trifluoride, on the coal tar naphthas. The polymers, generally, are not homopolymers, but are derived from mixtures of several resin-forming materials. The polymers may also be condensed with phenol and derivatives thereof, or with lower aliphatic aldehydes such as formaldehyde, or may be hydrogenated to remove residual unsaturation. The hydrocarbon resins as described above, and in for example in chapter 3 of the book, Synthetic Resins and Rubbers, by P./O. Powers, are well known to those skilled in the art, being commonly used in the plasticization of rubbers, and in manufacture of varnishes and paints. Such hydrocarbon resins are readily available on a commercial basis and include, for example, the polyindenes, polycoumarones, courmaroneindene polymers, phenol modified coumarone-indene polymers, coumarone-indene-styrene polymers, styrene-cyclopentadiene polymers, styrene-indene polymers, dicyclopentadiene resins, terpene resins, naphthalenic resins, anthracenic resins, etc.

As preferred embodiment of this invention, it is preferred that the high melting hydrocarbon resins be predominantly cycloaliphatic and aromatic in structure and have melting points from about 150° F. to about 350° F. It is also preferred that such hydrocarbon resins have molecular weights in the range of 350 to 2500, and specific gravities in the range of 1.00 to 1.30, and that such hydrocarbon resins consist of at least 80 weight percent carbon, the remainder of the resin being hydrogen, oxygen, sulfur, or combinations thereof. Although other hydrocarbon resins may be used in the present invention, it has been found that those hydrocarbon resins which satisfy both of the above specifications are most satisfactory in terms of obtaining homogeneous compositions characterized by the unique combination of physical properties inherent in the present invention.

The method of blending the poly(phenylene ether) resin with the hydrocarbon resin is not critical, and does not constitute a part of this invention. Preferably the poly (phenylene ether) resin and hydrocarbon resin are physically admixed by means of any mechanical mixing device conventionally used for mixing rubbers or plastics, such as an extruder, Banbury mixer, or differential roll mill. In order to facilitate thorough mixing of the polymers and to develop the desired improved combination of physical properties, the mechanical blending is carried out at sufficiently high temperatures to soften the polymers so that they are thoroughly dispersed and intermingle with each other.

Alternatively the poly(phenylene ether) resin and hydrocarbon resin may be solution blended by dissolving the polymers in a solvent such as toluene and subsequently precipitating the polymer blend by adding the solution to a non-solvent such as isopropanol, producing a homogeneous blend which is then dried by any suitable method.

The mixtures of the invention may contain certain other additives to plasticize, lubricate, dye, pigment, prevent oxidation of, retard flammability of, etc., the resin blends. Such additives are well known in the art and may be incorporated without departing from the scope of the invention.

The benefits obtained by blending a hydrocarbon resin with a poly(phenylene ether) resin are illustrated in the following examples which are set forth as a further description of the invention, but are not to be construed as limiting the invention thereto.

The test data included in the following examples was determined according to ASTM procedures:

D790-66 __ Elastic modulus in flexure.
D638-64T _ Tensile strength.
D648-56 __ Heat distortion temperatures (at 264 p.s.i.).

EXAMPLES 1-3

A coumarone-indene resin was blended with a poly(phenylene ether) resin at the 10, 20, and 30 percent (by weight) levels. The particular coumarone-indene resin was manufactured by Allied Chemical Company, coded Cumar W2.5, and was characterized by a softening point of 266° F. (ASTM E28-58T), a molecular weight of about 1000, a specific gravity of 1.129, and the resin contained 90.6% by weight carbon, 7.7% by wt. hydrogen, the remainder being oxygen and sulfur. The polyphenylene ether resin (also referred to as PPO) was produced by the General Electric Company and coded type 531-801. This particular material was a poly(2,6-dimethyl-1,4-phenylene ether) resin and was characterized by an intrinsic viscosity of 0.58 measured in toluene at 30° C.

The polyphenylene oxide and coumarone-indene resin were mixed in the molten state in a Banbury internal shear mixer at a mean shear rate of 300 sec.$^{-1}$. A six minute mixing time was found sufficient to obtain a homogeneous mixture of the two polymers. The mixing temperature ranged from 500° to 400° F. depending on the amount of hydrocarbon resin present in the composition, i.e., the mixing temperature for a particular blend was inversely proportional to the amount of hydrocarbon resin present in the blend. The blends were subsequently calendered into sheet material from which plaques were then compression molded at 350 p.s.i. Test specimens were machine cut from these plaques. Physical test data is summarized in Table I.

TABLE I.—COMPARISON OF RESIN AND POLYBLEND PROPERTIES

| | Percent by weight | | Flexural modulus p.s.i. | Tensile strength, p.s.i. | Heat distortion temperature, °F. |
|---|---|---|---|---|---|
| | Hydrocarbon resin (Cumar W2.5) | PPO | | | |
| Control | | 100 | 342,000 | 10,400 | 374 |
| Example: | | | | | |
| 1 | 10 | 90 | 396,000 | 12,000 | 335 |
| 2 | 20 | 80 | 428,000 | 11,800 | 303 |
| 3 | 30 | 70 | 455,000 | 11,500 | 273 |

As shown in Table I, the addition of a coumarone-indene resin to the poly(phenylene ether) resin results in compositions characterized by substantially increased moduli or stiffness, and substantially increased tensile strength. The compositions are also characterized by reduced heat distortion temperatures, almost directly in proportion to the amount of hydrocarbon resin present in the blend, indicating a reduction in the melt processing temperatures required for the molding of the compositions.

EXAMPLES 4-5

A coumarone-indene-styrene resin was blendeed with a poly(phenylene ether) resin, of the type in Example 1, at the 10 and 20 percent by weight levels. The particular coumarone-indene-styrene resin was manufactured by the Neville Chemical Company, coded Nevidene LX509 and was characterized by a softening point of 320° F. (ASTM E28-58T), a molecular weight of about 1150, a specific gravity of 1.206, and the resin contained 90.2% carbon, 6.9% hydrogen, the remainder being oxygen and sulfur. The poly-(phenylene ether) resin and hydrocarbon resin were blended and fabricated according to the procedure described in Example 1. Physical test data is summarized in Table II.

TABLE II.—COMPARISON OF RESIN AND POLYBLEND PROPERTIES

| | Percent by weight | | Flexural modulus, p.s.i. | Tensile strength, p.s.i | Heat distortion temperature, °F. |
|---|---|---|---|---|---|
| | Hydrocarbon resin (Nevidene LX509) | PPO | | | |
| Control | | 100 | 342,000 | 10,400 | 374 |
| Example: | | | | | |
| 4 | 10 | 90 | 409,000 | 12,100 | 344 |
| 5 | 20 | 80 | 430,000 | 13,700 | 318 |

As shown in Table II, the addition of a coumarone-indene-styrene resin to the poly(phenylene ether) resin results in compositions characterized by substantially increased moduli or stiffness, and substantially increased tensile strength. Other benefits which result from the blending of a hydrocarbon resin with poly(phenylene ether) resin include a reduction in heat distortion temperature, and correspondingly a reduction in the melt processing temperatures required for molding the compositions.

EXAMPLES 6-7

A phenol modified coumarone-indene resin was blended with a poly(phenylene ether) resin, of the type in Example 1, at the 10 and 20 percent by weight levels. The particular phenol-coumarone-indene resin was manufactured by Neville Chemical Company, coded Nevillac H, and was characterized by a softening point of 167° F. (ASTM E28-58T), a molecular weight of about 410, a specific gravity of 1.144, and the resin contained 86.5% carbon, 7.8% hydrogen, the remainder being oxygen and sulfur. The poly(phenylene ether) resin and hydrocarbon resin were blended and fabricated according to the procedure described in Example 1. Physical test data is summarized in Table III.

TABLE III.—COMPARISON OF RESIN AND POLYBLEND PROPERTIES

| Percent by weight | | Flexural modulus, p.s.i. | Tensile strength, p.s.i. | Heat distortion temperature, °F. |
|---|---|---|---|---|
| Hydrocarbon resin (Nevillac H) | PPO | | | |
| Control | 100 | 342,000 | 10,400 | 374 |
| Example: | | | | |
| 6 | 10 | 90 | 444,000 | 13,000 | 310 |
| 7 | 20 | 80 | 487,000 | 14,600 | 295 |

As shown in Table III, the addition of a phenol-coumarone-indene resin to the poly(phenylene ether) resin results in compositions characterized by substantially increased moduli or stiffness and substantially increased tensile strengths. Other benefits which result from the blending of a hydrocarbon resin with a poly(phenylene ether) resin include a reduction in heat distortion temperature, and correspondingly a reduction in the melt processing temperatures required for molding the compositions.

EXAMPLES 8–9

A cyclopentadiene-styrene resin was blended with a poly(phenylene ether) resin, of the type in Example 1, at the 10 and 20% by weight levels. The particular cyclopentadiene-styrene resin was manufactured by Neville Chemical Company, coded Neville LX685–180, and was characterized by a softening point of 302° F. (ASTM E28–58T), a molecular weight of about 890, a specific gravity of 1.095, and the resin contained 89.9% carbon, 9.1% hydrogen, the remainder being oxygen and sulfur. The poly(phenylene ether) resin and hydrocarbon resin were blended and fabricated according to the procedure described in Example 1. Physical test data is summarized in Table IV.

TABLE IV.—COMPARISON OF RESIN AND POLYBLEND PROPERTIES

| Percent by weight | | Flexural modulus, p.s.i. | Tensile strength, p.s.i. | Heat distortion temperature, °F. |
|---|---|---|---|---|
| Hydrocarbon resin (Neville LX685–180) | PPO | | | |
| Control | 100 | 342,000 | 10,400 | 374 |
| Example: | | | | |
| 8 | 10 | 90 | 391,000 | 11,800 | 344 |
| 9 | 20 | 80 | 409,000 | 10,900 | 317 |

As shown in Table IV, the addition of a cyclopentadiene-styrene resin to the poly(phenylene ether) resin results in composition characterized by substantially increased moduli or stiffness and substantially increased tensile strength. Other benefits which result from the blending of a hydrocarbon resin with a poly(phenylene ether) resin include a reduction in heat distortion temperatures, and correspondingly a reduction in the melt processing temperatures required for molding the compositions.

EXAMPLES 10–11

A cyclopentadiene-indene resin was blended with a poly(phenylene ether) resin, of the type in Example 1, at the 10 and 20 percent by weight levels. The particular cyclopentadiene-indene resin was manufactured by Neville Chemical Company, coded Nebony 100, and was characterized by a softening point of 215° F. (ASTM E28–58T), molecular weight of about 475, a specific gravity of 1.163, and the resin contained 92.9% carbon, 7.0% hydrogen, the remainder being oxygen and sulfur. The poly(phenylene ether) resin and hydrocarbon resin were blended and fabricated according to the procedure described in Example 1. Physical test data is summarized in Table V.

TABLE V.—COMPARISON OF RESIN AND POLYBLEND PROPERTIES

| Percent by weight | | Flexural modulus, p.s.i. | Tensile strength, p.s.i. | Heat distortion, temperature, °F. |
|---|---|---|---|---|
| Hydrocarbon resin (Nebony 100) | PPO | | | |
| Control | 100 | 342,000 | 10,400 | 374 |
| Example: | | | | |
| 10 | 10 | 90 | 422,000 | 12,700 | 325 |
| 11 | 20 | 80 | 440,000 | 13,000 | 318 |

As shown in Table V, the addition of a cyclopentadiene-indene resin to the poly(phenylene ether) resin results in compositions characterized by substantially increased moduli or stiffness and substantially increased tensile strength. Other benefits which result from the blending of a hydrocarbon resin with a poly(phenylene ether) resin include a reduction in heat distortion temperature, and correspondingly a reduction in the melt processing temperature required for molding the compositions.

EXAMPLES 12–13

An aromatic-petroleum hydrocarbon resin was blended with a poly(phenylene ether) resin, of the type in Example 1. The particular aromatic-petroleum resin was manufactured by Neville Chemical Company, coded Nevichem 140, and was characterized by a softening point of 282° F. (ASTM E28–58T), a molecular weight of about 1150, a specific gravity of 1.050, and the particular resin contained 90.8% carbon, 8.4% hydrogen, the remainder being oxygen and sulfur. The hydrocarbon resin and poly(phenylene ether) resin were blended and fabricated according to the procedure described in Example 1. Physical test data is summarized in Table VI.

TABLE VI.—COMPARISON OF RESIN AND POLYBLEND PROPERTIES

| Percent by weight | | Flexural modulus, p.s.i. | Tensile strength, p.s.i. | Heat distortion temperature, °F. |
|---|---|---|---|---|
| Hydrocarbon resin (Nevichem 140) | PPO | | | |
| Control | 100 | 342,000 | 10,400 | 374 |
| Example: | | | | |
| 12 | 10 | 90 | 391,000 | 11,800 | 340 |
| 13 | 20 | 80 | 410,000 | 12,500 | 259 |

As shown in Table VI, the addition of an aromatic-petroleum hydrocarbon resin to the poly(phenylene ether) resin results in compositions characterized by substantially increased moduli or stiffness and substantially increased tensile strength. Other benefits which result from the blending of a hydrocarbon resin with a poly(phenylene ether) resin include a reduction in heat distortion temperature, and correspondingly a reduction in the melt processing temperatures required for molding the compositions.

Because of their unique combination of physical properties and excellent thermal properties, the polymer blends of this invention have many and varied uses. For example, they can be used in molding powder formulations either alone or mixed with various fillers such as wood, flour, diatomaceous earth, carbon black, silica, etc., to make molded parts such as gears, bearings, and cams, especially for applications where high stiffness and strength are required. They can be used to prepare molded, calendered, or extruded articles and can be applied to a broad spectrum of uses in the form of sheets, rods, tapes, etc. The compositions may also be mixed with various modifying agents such as dyes, pigments, stabilizers, plasticizers, flame retardants, etc., which are well known to those skilled in the art.

Obviously, other modifications and variations of the present invention are possible in light of the above disclosures. It is, therefore, to be understood that changes may be made in the particular embodiments of the invention described which are within the full intended scope of the invention as defined by the appended claims.

Having thus described our invention, what we claim and desire to protect by Letters Patent is:

1. A thermoplastic blended composition comprising:
(A) from 55% to 99% by weight of a thermoplastic polyphenylene oxide resin having the repeating unit:

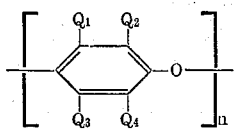

wherein the oxygen ether atom of one unit is connected to the benzene nucleus of the next adjoining unit, $n$ is a positive integer and is at least 100, and $Q_1$ thru $Q_4$ are monovalent substituents, each selected from the group consisting of hydrogen, halogen, hydrocarbon radicals free of tertiary alpha-carbon atoms, halohydrocarbon radicals having at least two carbon atoms between the halogen atom and phenol nucleus and being free of tertiary alphacarbon atoms, and halohydrocarbonoxy radicals having at least two carbon atoms between the halogen atom and phenol nucleus and being free of tertiary alpha-carbon atoms, and
(B) correspondingly from 45% to 1% of a high melting hydrocarbon resin which is selected from the group consisting of coumarone-indene-resin, phenol modified coumarone-indene resin and cyclopentadiene-indene resin.

2. A resin blend of claim 1 where the high melting hydrocarbon resin is a coumarone-indene-resin.

3. A resin blend of claim 1 where the high melting hydrocarbon resin is a phenol modified coumarone-indene resin.

4. A resin blend of claim 1 where the high melting hydrocarbon resin is a cyclopentadiene-indene resin.

References Cited

UNITED STATES PATENTS

| | | | |
|---|---|---|---|
| 3,373,226 | 3/1968 | Gowan | 260—874 |
| 3,383,435 | 5/1968 | Cizek | 260—874 |
| 3,384,682 | 5/1968 | Erchak | 260—874 |

FOREIGN PATENTS

| | | | |
|---|---|---|---|
| 43/17,812 | 7/1968 | Japan | 260—874 |

PAUL LIEBERMAN, Primary Examiner

U.S. Cl. X.R.

260—47 R, 823, 874